United States Patent [19]
Hillier

[11] Patent Number: 6,100,794
[45] Date of Patent: Aug. 8, 2000

[54] FIFTH WHEEL COUPLING SAFETY SYSTEM

[76] Inventor: Terrence E. Hillier, 420 Talbot #307, St. Thomas, Ontario, Canada, N5P 1B9

[21] Appl. No.: 09/252,107

[22] Filed: Feb. 18, 1999

[51] Int. Cl.⁷ .................................................. G08B 21/00
[52] U.S. Cl. ....................... 340/431; 340/686.2; 340/687; 280/433; 280/477; 280/DIG. 14; 307/9.1
[58] Field of Search ................................ 340/431, 686.2, 340/687; 280/186, 433, 441, 446.1, 477, DIG. 14; 307/9.1

[56] References Cited

U.S. PATENT DOCUMENTS

| | | | |
|---|---|---|---|
| 3,697,974 | 10/1972 | Harris et al. | 340/431 |
| 4,649,369 | 3/1987 | walker et al. | 340/431 |
| 5,477,207 | 12/1995 | Frame, Sr. et al. | 340/431 |
| 5,861,802 | 1/1999 | Hungerink et al. | 340/431 |

*Primary Examiner*—Daniel J. Wu

[57] ABSTRACT

A fifth wheel coupling safety system for indicating when a king pin is properly locked into a fifth wheel assembly. The system includes a fifth wheel assembly having a slot for receiving a king pin of a trailer and a locking mechanism for coupling the king pin to the fifth wheel assembly. The locking mechanism has a locking jaw adapted for coupling the king pin to the fifth wheel assembly, and a pull handle for positioning the locking jaw between locked and unlocked positions. The locking jaw couples the king pin to the fifth wheel assembly when in the locked position and permits separation of the king pin from the fifth wheel assembly when in the unlocked position. The pull handle is positionable between a locking position and an unlocking position. The pull handle positions the locking jaw in the locked position when the pull handle is in the locking position and the pull handle positions the locking jaw in the unlocked position when the pull handle is in the unlocking position. A detector is provided for detecting when the pull handle is properly positioned in the locking position when a king pin of a trailer is inserted into the slot of the fifth wheel assembly. An indicator electrically connected to the detector is also provided for indicating to a user the pull handle is properly positioned in the locking position when a king pin of a trailer is inserted into the slot of the fifth wheel assembly.

9 Claims, 5 Drawing Sheets

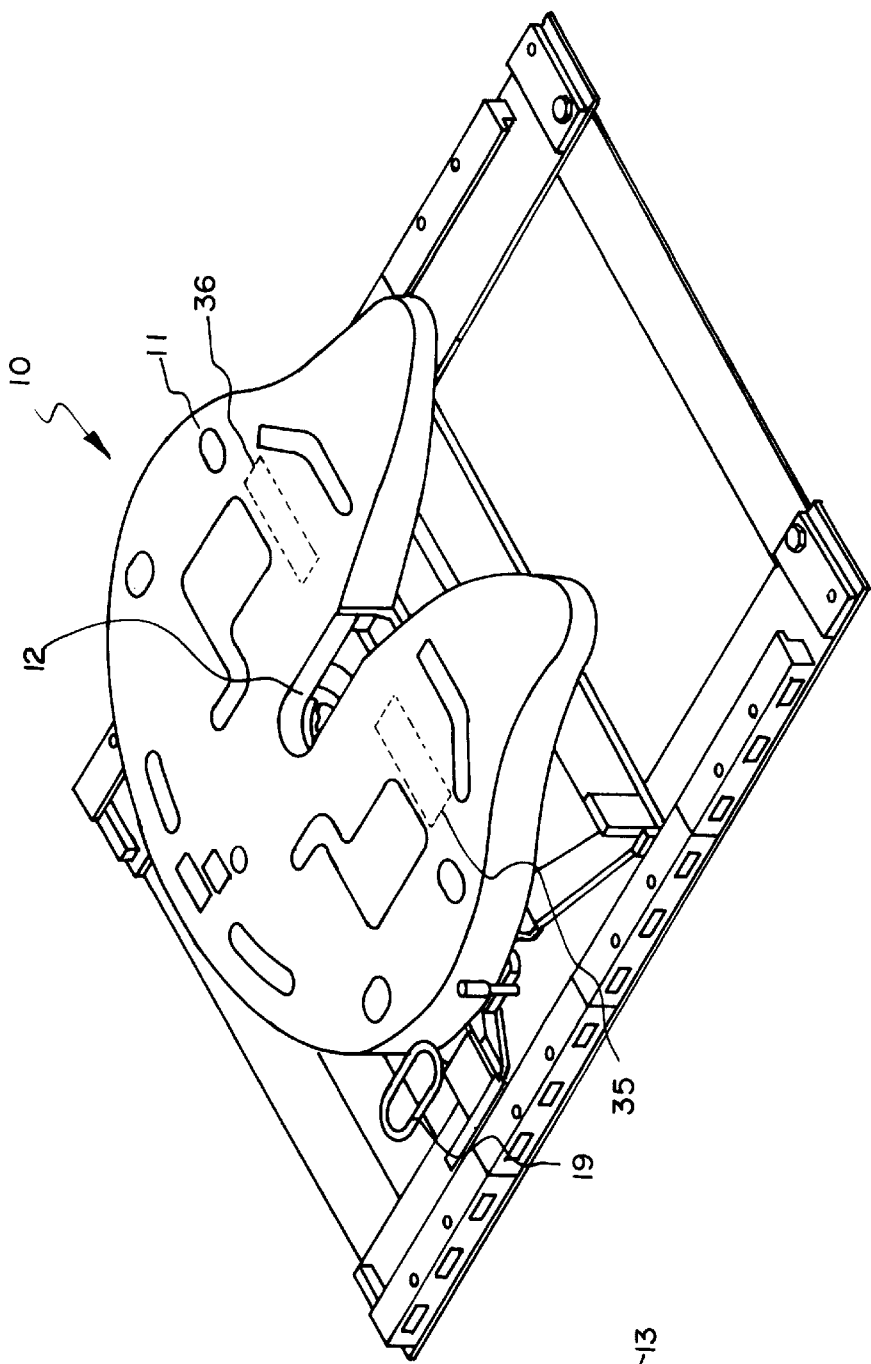
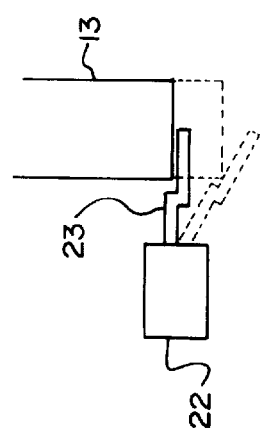
FIG. 3
FIG. 2

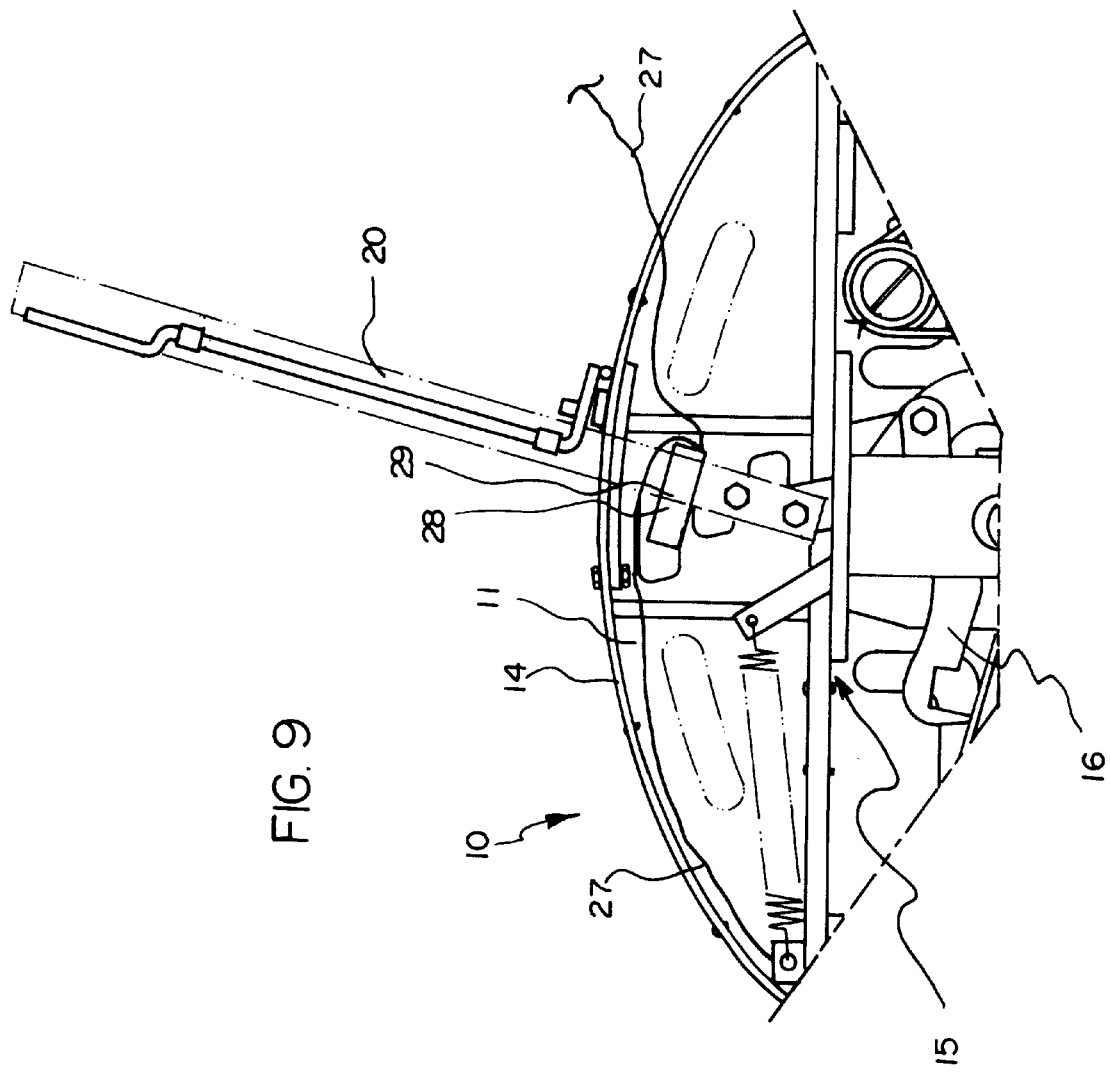

006,100,794

FIFTH WHEEL COUPLING SAFETY SYSTEM

BACKGROUND OF THE INVENTION

1. Field of the Invention

The present invention relates to fifth wheel safety devices and more particularly pertains to a new fifth wheel coupling safety system for indicating when a king pin is properly locked into a fifth wheel assembly.

2. Description of the Prior Art

The use of fifth wheel safety devices is known in the prior art. More specifically, fifth wheel safety devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art fifth wheel safety devices include U.S. Pat. No. 5,434,552; U.S. Pat. No. 4,898,400; U.S. Pat. No. 4,593,264; U.S. Pat. No. 5,421,600; U.S. Pat. No. 4,627,633; and U.S. Pat. No. 4,271,401.

While these devices fulfill their respective, particular objectives and requirements, the aforementioned patents do not disclose a new fifth wheel coupling safety system. The inventive device includes a fifth wheel assembly having a slot for receiving a king pin of a trailer and a locking mechanism for coupling the king pin to the fifth wheel assembly. The locking mechanism has a locking jaw adapted for coupling the king pin to the fifth wheel assembly, and a pull handle for positioning the locking jaw between locked and unlocked positions. The locking jaw couples the king pin to the fifth wheel assembly when in the locked position and permits separation of the king pin from the fifth wheel assembly when in the unlocked position. The pull handle is positionable between a locking position and an unlocking position. The pull handle positions the locking jaw in the locked position when the pull handle is in the locking position and the pull handle positions the locking jaw in the unlocked position when the pull handle is in the unlocking position. A detector is provided for detecting when the pull handle is properly positioned in the locking position when a king pin of a trailer is inserted into the slot of the fifth wheel assembly. An indicator electrically connected to the detector is also provided for indicating to a user the pull handle is properly positioned in the locking position when a king pin of a trailer is inserted into the slot of the fifth wheel assembly.

In these respects, the fifth wheel coupling safety system according to the present invention substantially departs from the conventional concepts and designs of the prior art, and in so doing provides an apparatus primarily developed for the purpose of indicating when a king pin is properly locked into a fifth wheel assembly.

SUMMARY OF THE INVENTION

In view of the foregoing disadvantages inherent in the known types of fifth wheel safety devices now present in the prior art, the present invention provides a new fifth wheel coupling safety system construction wherein the same can be utilized for indicating when a king pin is properly locked into a fifth wheel assembly.

The general purpose of the present invention, which will be described subsequently in greater detail, is to provide a new fifth wheel coupling safety system apparatus and method which has many of the advantages of the fifth wheel safety devices mentioned heretofore and many novel features that result in a new fifth wheel coupling safety system which is not anticipated, rendered obvious, suggested, or even implied by any of the prior art fifth wheel safety devices, either alone or in any combination thereof.

To attain this, the present invention generally comprises a fifth wheel assembly having a slot for receiving a king pin of a trailer and a locking mechanism for coupling the king pin to the fifth wheel assembly. The locking mechanism has a locking jaw adapted for coupling the king pin to the fifth wheel assembly, and a pull handle for positioning the locking jaw between locked and unlocked positions. The locking jaw couples the king pin to the fifth wheel assembly when in the locked position and permits separation of the king pin from the fifth wheel assembly when in the unlocked position. The pull handle is positionable between a locking position and an unlocking position. The pull handle positions the locking jaw in the locked position when the pull handle is in the locking position and the pull handle positions the locking jaw in the unlocked position when the pull handle is in the unlocking position. A detector is provided for detecting when the pull handle is properly positioned in the locking position when a king pin of a trailer is inserted into the slot of the fifth wheel assembly. An indicator electrically connected to the detector is also provided for indicating to a user the pull handle is properly positioned in the locking position when a king pin of a trailer is inserted into the slot of the fifth wheel assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fifth wheel coupling safety system apparatus and method which has many of the advantages of the fifth wheel safety devices mentioned heretofore and many novel features that result in a new fifth wheel coupling safety system which is not anticipated, rendered obvious, suggested, or even implied by any of the prior art fifth wheel safety devices, either alone or in any combination thereof.

It is another object of the present invention to provide a new fifth wheel coupling safety system which may be easily and efficiently manufactured and marketed.

It is a further object of the present invention to provide a new fifth wheel coupling safety system which is of a durable and reliable construction.

An even further object of the present invention is to provide a new fifth wheel coupling safety system which is susceptible of a low cost of manufacture with regard to both materials and labor, and which accordingly is then susceptible of low prices of sale to the consuming public, thereby making such fifth wheel coupling safety system economically available to the buying public.

Still yet another object of the present invention is to provide a new fifth wheel coupling safety system which provides in the apparatuses and methods of the prior art some of the advantages thereof, while simultaneously overcoming some of the disadvantages normally associated therewith.

Still another object of the present invention is to provide a new fifth wheel coupling safety system for indicating when a king pin is properly locked into a fifth wheel assembly.

Yet another object of the present invention is to provide a new fifth wheel coupling safety system which includes a fifth wheel assembly having a slot for receiving a king pin of a trailer and a locking mechanism for coupling the king pin to the fifth wheel assembly. The locking mechanism has a locking jaw adapted for coupling the king pin to the fifth wheel assembly, and a pull handle for positioning the locking jaw between locked and unlocked positions. The locking jaw couples the king pin to the fifth wheel assembly when in the locked position and permits separation of the king pin from the fifth wheel assembly when in the unlocked position. The pull handle is positionable between a locking position and an unlocking position. The pull handle positions the locking jaw in the locked position when the pull handle is in the locking position and the pull handle positions the locking jaw in the unlocked position when the pull handle is in the unlocking position. A detector is provided for detecting when the pull handle is properly positioned in the locking position when a king pin of a trailer is inserted into the slot of the fifth wheel assembly. An indicator electrically connected to the detector is also provided for indicating to a user the pull handle is properly positioned in the locking position when a king pin of a trailer is inserted into the slot of the fifth wheel assembly.

Commonly, kin pins are improperly coupled to a fifth wheel due to user error. Still yet another object of the present invention is to provide a new fifth wheel coupling safety system that indicates when the pull handle of a locking mechanism of a fifth wheel assembly, in particular a Fontaine Fifth Wheel, is properly positioned in a locking position when a king pin inserted into the slot of the fifth wheel assembly is locked by the locking mechanism of the fifth wheel assembly.

Even still another object of the present invention is to provide a new fifth wheel coupling safety system that prevents ice and debris from accumulating under the fifth wheel assembly thereby reducing faulty couplings from dirty and ice incrusted locking mechanism of the fifth wheel assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic side view of the first switch of the present invention illustrating the movement of the first actuator when the king pin is properly inserted into the slot of the fifth wheel assembly.

FIG. 3 is a schematic perspective view of the present invention illustrating the positioning of the heaters of the dust pan when mounted to the fifth wheel assembly.

FIG. 9 is a schematic partial underside view of a fifth wheel assembly having a lock release bar instead of a pull handle.

DESCRIPTION OF THE PREFERRED EMBODIMENT

Figure 1:
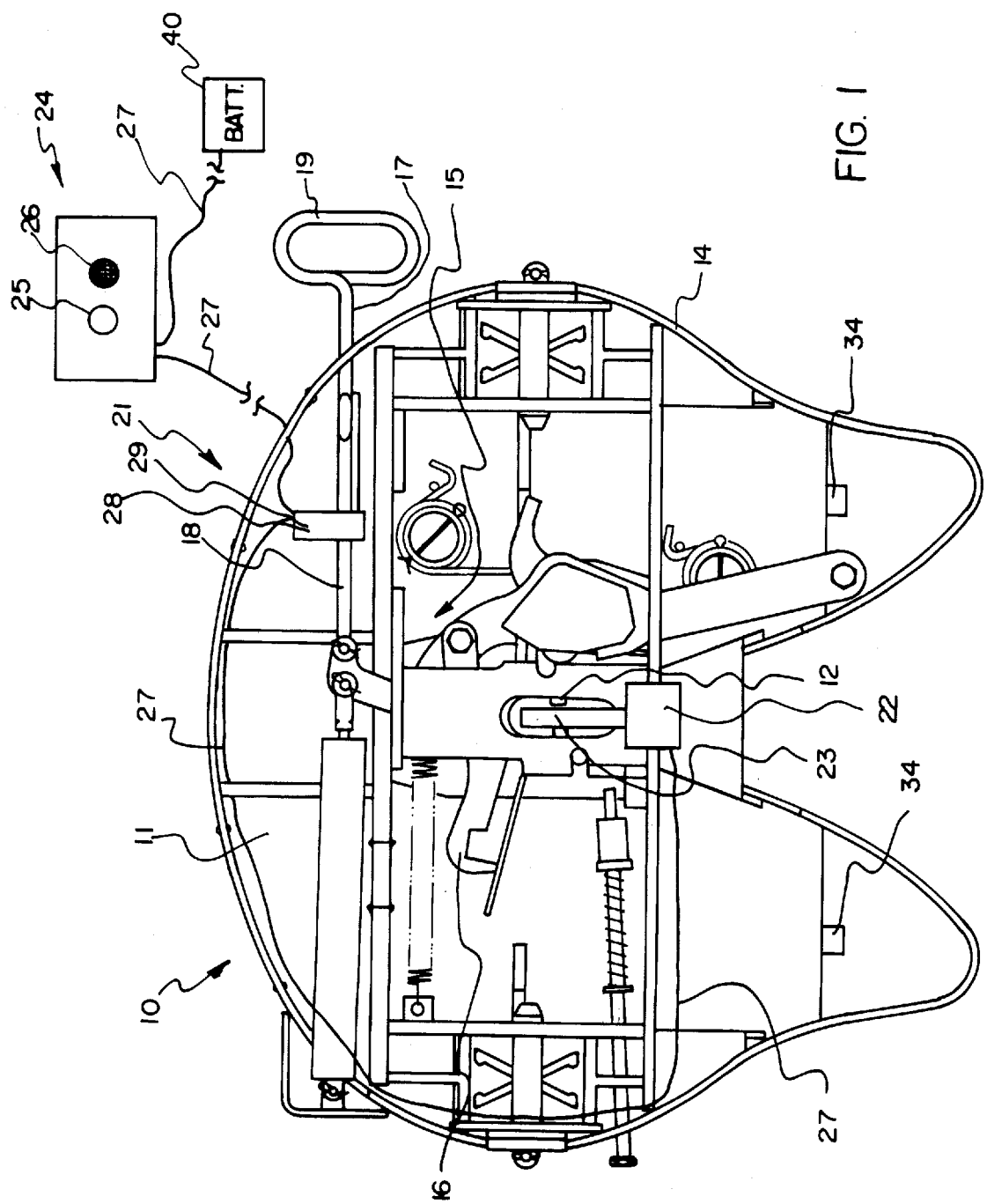
FIG. 1 is a schematic underside view of a new fifth wheel coupling safety system according to the present invention.
Figure 4:
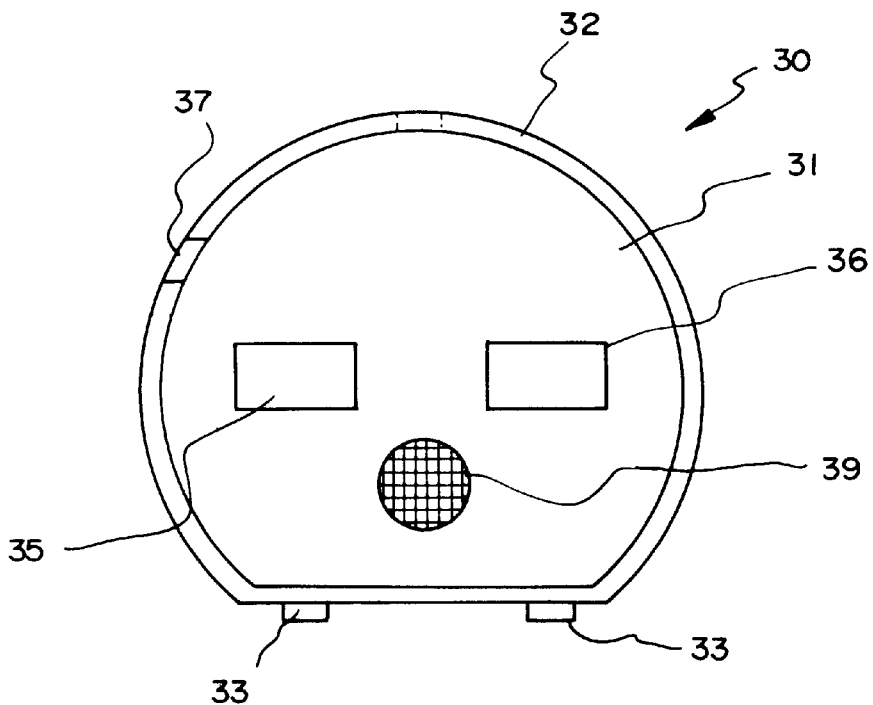
FIG. 4 is a schematic top side view of the dust pan of the present invention.
Figure 5:
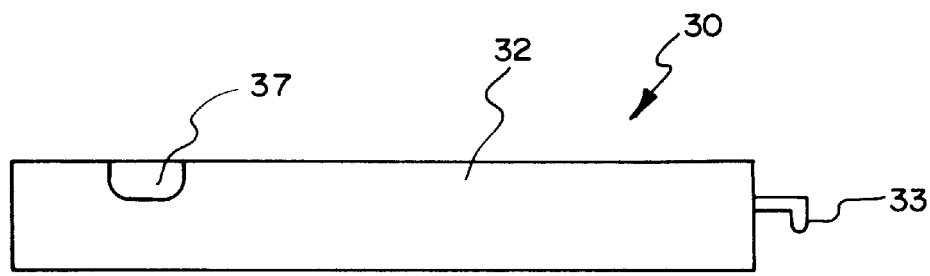
FIG. 5 is a schematic side view of the dust pan of the present invention.
Figure 6:
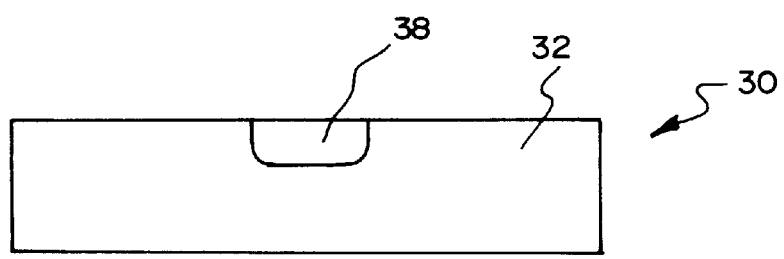
FIG. 6 is a schematic front end view of the dust pan of the present invention.
Figure 7:
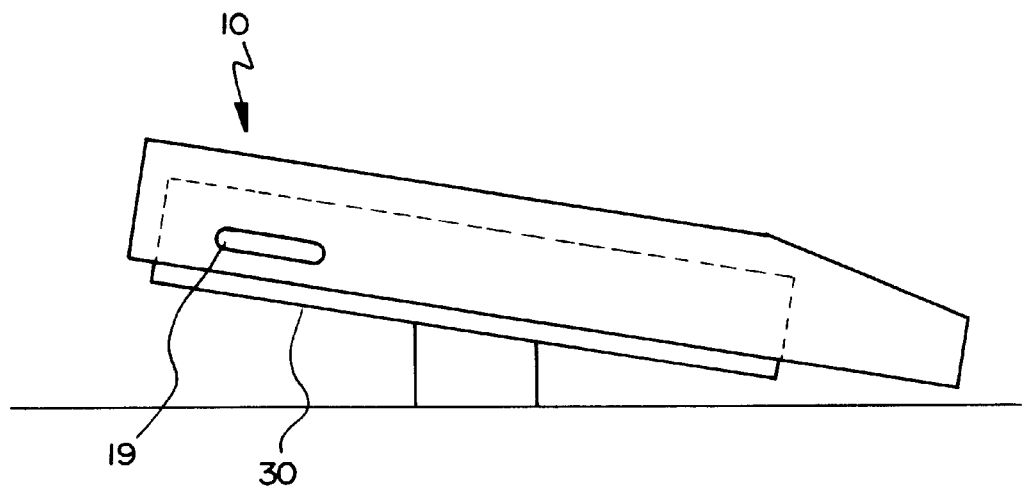
FIG. 7 is a schematic side view of the present invention with the dust pan attached.
Figure 8:
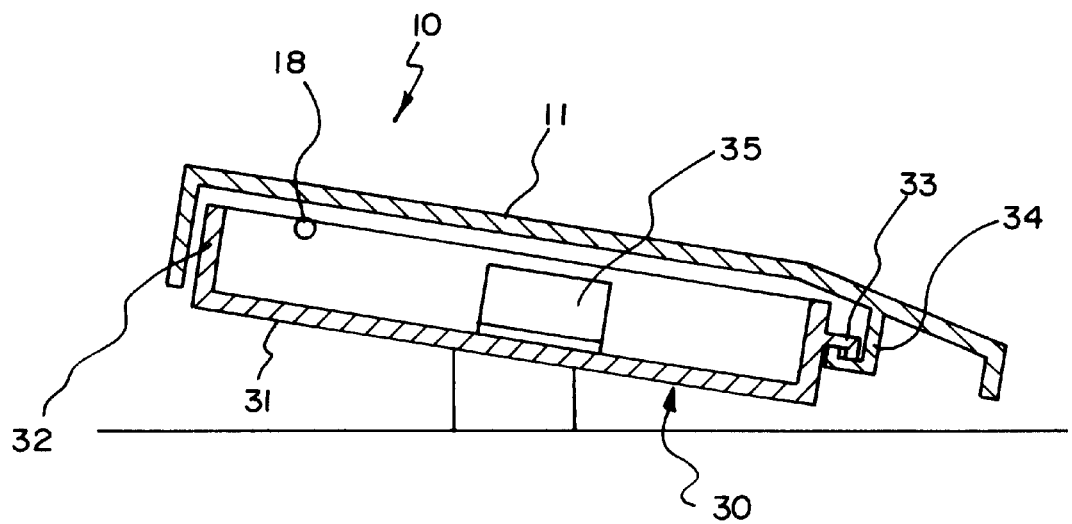
FIG. 8 is a schematic cross sectional view of the present invention particularly illustrating the dust pan.

With reference now to the drawings, and in particular to FIGS. 1 through 9 thereof, a new fifth wheel coupling safety system embodying the principles and concepts of the present invention will be described.

As best illustrated in FIGS. 1 through 9, the fifth wheel coupling safety system generally comprises a fifth wheel assembly 10 having a slot 12 for receiving a king pin 13 of a trailer and a locking mechanism 15 for coupling the king pin 13 to the fifth wheel assembly 10. The locking mechanism 15 has a locking jaw 16 adapted for coupling the king pin 13 to the fifth wheel assembly 10, and a pull handle 17 for positioning the locking jaw 16 between locked and unlocked positions. The locking jaw 16 couples the king pin 13 to the fifth wheel assembly 10 when in the locked position and permits separation of the king pin 13 from the fifth wheel assembly 10 when in the unlocked position. The pull handle 17 is positionable between a locking position and an unlocking position. The pull handle 17 positions the locking jaw 16 in the locked position when the pull handle 17 is in the locking position and the pull handle 17 positions the locking jaw 16 in the unlocked position when the pull handle 17 is in the unlocking position. A detector 21 is provided for detecting when the pull handle 17 is properly positioned in the locking position when a king pin 13 of a trailer is inserted into the slot 12 of the fifth wheel assembly 10. An indicator 24 electrically connected to the detector 21 is also provided for indicating to a user the pull handle 17 is properly positioned in the locking position when a king pin 13 of a trailer is inserted into the slot 12 of the fifth wheel assembly 10.

In use, the safety system is designed for indicating when a pull handle 17 of a locking mechanism 15 of a fifth wheel assembly 10 is properly positioned in a locked position when coupling a king pin 13 of a trailer to the fifth wheel assembly 10. Specially, the fifth wheel assembly 10 has a top plate 11, a slot 12 for receiving a king pin 13 of a trailer, a lower lip 14 extending around the top plate 11, and a locking mechanism 15 for coupling the king pin 13 to the fifth wheel assembly 10. The locking mechanism 15 has a locking jaw 16 adapted for releasably coupling the king pin 13 to the fifth wheel assembly 10, and a pull handle 17 for positioning the locking jaw 16 between locked and unlocked positions. The locking jaw 16 couples the king pin 13 to the fifth wheel assembly 10 when in the locked position. When in the unlocked position, the locking jaw 16 permits separation of the king pin 13 from the fifth wheel assembly 10. The pull handle 17 has an elongate shaft 18 extending outwardly from the lower lip 14 of the fifth wheel assembly 10 and terminates at a handle loop 19 adjacent the exterior of the lower lip 14. Alternatively, instead of a pull handle 17 a lock release bar 20 may be employed as illustrated in FIG. 9. In this case, the lock release bar 20 is pivoted between the locking and locking positions. The pull handle 17 is positionable between a locking position and an unlocking position. In use, the pull handle 17 positions the locking jaw 16 in the locked position when the pull handle 17 is in the locking position. When in the unlocking position, the pull handle 17 positions the locking jaw 16 in the unlocked position when the pull handle 17.

In a typical Fontaine Fifth Wheel, the pull handle 17 must be pushed and then dropped into a lower position to go from the unlocking position to the locking position, conversely the pull handle 17 must be lifted from the lower position and then pulled outwards from the lower lip 14 to go from the locking position to the unlocking position. Sometimes the push handle fails to drop into the lower position, especially in cold weather, thereby failing to properly position the locking jaw in the locked position and thus failing to couple the king pin to the fifth wheel assembly. The safety device alerts a user to this failure so that the user can properly position the pull handle in the locking position.

A detector 21 is provided for detecting when the pull handle 17 is properly positioned in the locking position when a king pin 13 of a trailer is inserted into the slot 12 of the fifth wheel assembly 10. The detector 21 has a first switch 22 for activating the detector 21 when the king pin 13 is properly positioned in the slot 12 of the fifth wheel assembly. The first switch 22 has a pivotally mounted first actuator 23 positioned below the proper position for the king pin 13 in the slot 12 of the fifth wheel assembly 10. Ideally, the king pin 13 pivots the first actuator 23 to a position activating the first switch 22 when the king pin 13 is properly positioned in the slot 12 of the fifth wheel assembly 10.

An indicator 24 is also provided for indicating to a user the pull handle 17 is properly positioned in the locking position when a king pin 13 of a trailer is inserted into the slot 12 of the fifth wheel assembly 10. The indicator 24 is electrically connected to the detector 21 by wires 27 and is also preferably electrically connected to a power source 40 such as a battery power source of the vehicle. The indicator 24 is adapted for mounting to the vehicle with the fifth wheel assembly 10. The indicator 24 has a light source 25 for providing a visual indicator to the user and an audible sound generating device 26 such as a buzzer for providing an audible indicator to the user. In use, the light source 25 and the audible sound generating device 26 of the indicator 24 are activated to provide light and an audible sound when the first switch 22 is actuated by the first actuator 23 when the king pin 13 is properly inserted into the slot 12 of the fifth wheel assembly 10.

The detector 21 has a second switch 28 having a second actuator 29 mounted to the shaft 18 of the pull handle 17. The second actuator 29 actuates the second switch 28 when the pull handle 17 is properly positioned in the locking position. The second switch 28 deactivates the light source 25 and audible sound generating device 26 of the indicator 24 when activate to indicate to the user that the pull handle 17 is properly positioned in the locking position so that the lock jaw of the locking mechanism 15 is properly coupling the king pin 13 to the fifth wheel assembly 10. When the fifth wheel assembly has a lock release bar instead of a pull handle, the second switch would be mounted on or near the lock release handle in such as way that it is deactivated when the lock release bar is properly in the locked position.

Preferably, a dust pan 30 is also provided. The dust pan 30 has a bottom 31 and a perimeter side wall 32 extending around the bottom 31 of the dust pan 30. The dust pan 30 is designed for helping reduce fifth wheel locking failures because of ice and snow build ups under the fifth wheel assembly 10. The dust pan 30 is removably mounted beneath the fifth wheel assembly 10 preferably by a pair of mounting tabs 33 on the perimeter side wall 32 which engage a corresponding pair of mounting slots 12 on the fifth wheel assembly 10 adjacent the slot 12 of the fifth wheel assembly 10. The dust pan 30 has a pair of heaters 35,36, preferably 12-volt heaters, mounted to the bottom 31 of the dust pan 30. The heaters 35,36 are adapted for heating the locking mechanism 15 of the fifth wheel assembly 10 including the locking jaw 16 and the pull handle 17 to melt snow and ice off of the locking mechanism 15. The perimeter side wall 32 of the dust pan 30 preferably has a side cutout 37 for extending the shaft 18 of the pull handle 17 when the dust pan 30 is mounted to the fifth wheel assembly 10. Optionally, the perimeter side wall 32 may include a front cutout 38 adapted for extending the lock release bar 20 of a fifth wheel assembly 10 having the lock release bar 20 instead of the pull handle 17. The bottom 31 of the dust pan 30 also has a drain hole 39 therethrough preferably with a mesh screen covering the drain hole 39 to prevent passages of objects greater than a predetermined size through the drain hole 39.

In use, by installing the safety system on the fifth wheel assembly, user error is eliminated when locking the king pin to the fifth wheel assembly. The first switch prevents the indicators from activating when a king pin is not inserted into the fifth wheel assembly. Once the king pin is inserted, the indicator is activated. When the king pin is properly locked in place to the fifth wheel assembly, the indicator is deactivated to indicate to the user that the king pin is properly coupled to the fifth wheel assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A safety system for indicating when a pull handle of a locking mechanism of a fifth wheel assembly is properly positioned in a locked position when coupling a king pin of a trailer to the fifth wheel assembly, said safety system comprising:

a fifth wheel assembly having a slot for receiving a king pin of a trailer and a locking mechanism for coupling said king pin to said fifth wheel assembly;

said locking mechanism having a locking jaw adapted for coupling said king pin to said fifth wheel assembly, and a pull handle for positioning said locking jaw between locked and unlocked positions, said locking jaw coupling said king pin to said fifth wheel assembly when in said locked position, said locking jaw permitting separation of said king pin from said fifth wheel assembly when in said unlocked position;

said pull handle being positionable between a locking position and an unlocking position, wherein said pull handle positions said locking jaw in said locked position when said pull handle is in said locking position, wherein said pull handle positions said locking jaw in said unlocked position when said pull handle is in said unlocking position;

a detector for detecting when said pull handle is properly positioned in the locking position when a king pin of a trailer is inserted into the slot of the fifth wheel assembly; and an indicator for indicating to a user said pull handle is properly positioned in the locking position when a king pin of a trailer is inserted into the slot of the fifth wheel assembly, said indicator being electrically connected to said detector.

2. The safety system of claim 1, wherein said detector has a first switch for activating said detector when the king pin is properly positioned in said slot of said fifth wheel assembly, said first switch having a pivotally mounted first actuator positioned below the proper position for the king pin in said slot of said fifth wheel assembly, wherein the king pin pivots said first actuator to a position activating said first switch when said king pin is properly positioned in said slot of said fifth wheel assembly.

3. The safety system of claim 2, wherein said indicator has a light source for providing a visual indicator to the user and an audible sound generating device for providing an audible indicator to the user, said light source and said audible sound generating device of said indicator being activated when said first switch is actuated by said first actuator when the king pin is properly inserted into said slot of said fifth wheel assembly.

4. The safety system of claim 3, wherein said detector has a second switch having a second actuator mounted to said pull handle, said second actuator actuating said second switch when said pull handle is properly positioned in said locking position, said second switch deactivating said light source and audible sound generating device of said indicator when activate to indicate to the user that the pull handle is properly positioned in the locking position so that the lock jaw of the locking mechanism is properly coupling the king pin to the fifth wheel assembly.

5. The safety system of claim 1, further comprising a dust pan having a bottom and a perimeter side wall extending around said bottom of said dust pan, said dust pan being mounted beneath said fifth wheel assembly.

6. The safety system of claim 5, wherein said dust pan has a pair of heaters mounted to said bottom of said dust pan, said heaters being adapted for heating said locking mechanism of said fifth wheel assembly.

7. The safety system of claim 5, wherein said perimeter side wall of said dust pan has a side cutout for extending said pull handle when said dust pan is mounted to said fifth wheel assembly.

8. The safety system of claim 5, wherein said bottom of said dust pan has a drain hole therethrough.

9. A safety system for indicating when a pull handle of a locking mechanism of a fifth wheel assembly is properly positioned in a locked position when coupling a king pin of a trailer to the fifth wheel assembly, said safety system comprising:

a fifth wheel assembly having a top plate, a slot for receiving a king pin of a trailer, a lower lip extending around said top plate, and a locking mechanism for coupling said king pin to said fifth wheel assembly;

said locking mechanism having a locking jaw adapted for coupling said king pin to said fifth wheel assembly, and a pull handle for positioning said locking jaw between locked and unlocked positions, said locking jaw coupling said king pin to said fifth wheel assembly when in said locked position, said locking jaw permitting separation of said king pin from said fifth wheel assembly when in said unlocked position;

said pull handle having an elongate shaft extending outwardly from said lower lip of said fifth wheel assembly and terminating at a handle loop, said pull handle being positionable between a locking position and an unlocking position, wherein said pull handle positions said locking jaw in said locked position when said pull handle is in said locking position, wherein said pull handle positions said locking jaw in said unlocked position when said pull handle is in said unlocking position;

a detector for detecting when said pull handle is properly positioned in the locking position when a king pin of a trailer is inserted into the slot of the fifth wheel assembly;

said detector having a first switch for activating said detector when the king pin is properly positioned in said slot of said fifth wheel assembly, said first switch having a pivotally mounted first actuator positioned below the proper position for the king pin in said slot of said fifth wheel assembly, wherein the king pin pivots said first actuator to a position activating said first switch when said king pin is properly positioned in said slot of said fifth wheel assembly;

an indicator for indicating to a user said pull handle is properly positioned in the locking position when a king pin of a trailer is inserted into the slot of the fifth wheel assembly, said indicator being electrically connected to said detector;

said indicator having a light source for providing a visual indicator to the user and an audible sound generating device for providing an audible indicator to the user, said light source and said audible sound generating device of said indicator being activated when said first switch is actuated by said first actuator when the king pin is properly inserted into said slot of said fifth wheel assembly;

said detector having a second switch having a second actuator mounted to said shaft of said pull handle, said second actuator actuating said second switch when said pull handle is properly positioned in said locking position;

said second switch deactivating said light source and audible sound generating device of said indicator when activate to indicate to the user that the pull handle is properly positioned in the locking position so that the lock jaw of the locking mechanism is properly coupling the king pin to the fifth wheel assembly;

a dust pan having a bottom and a perimeter side wall extending around said bottom of said dust pan, said dust pan being removably mounted beneath said fifth wheel assembly;

said dust pan having a pair of heaters mounted to said bottom of said dust pan, said heaters being adapted for heating said locking mechanism of said fifth wheel assembly;

said perimeter side wall of said dust pan having a side cutout for extending said shaft of said pull handle when said dust pan is mounted to said fifth wheel assembly; and said bottom of said dust pan having a drain hole therethrough, said bottom of said dust pan having a mesh screen covering said drain hole to prevent passages of objects greater than a predetermined size through said drain hole.

* * * * *